United States Patent
Kolesnik et al.

(10) Patent No.: US 9,712,376 B2
(45) Date of Patent: Jul. 18, 2017

(54) CONNECTOR CONFIGURATION FOR EXTERNAL SERVICE PROVIDER

(71) Applicant: Red Hat Israel, Ltd., Raanana (IL)

(72) Inventors: Michael Kolesnik, Ramat-Gan (IL); Livnat Peer, Raanana (IL)

(73) Assignee: Red Hat Israel, Ltd., Raanana (IL)

( * ) Notice: Subject to any disclaimer, the term of this patent is extended or adjusted under 35 U.S.C. 154(b) by 473 days.

(21) Appl. No.: 14/188,947

(22) Filed: Feb. 25, 2014

(65) Prior Publication Data

US 2015/0188788 A1    Jul. 2, 2015

Related U.S. Application Data

(60) Provisional application No. 61/923,196, filed on Jan. 2, 2014.

(51) Int. Cl.
| | |
|---|---|
| *H04L 12/26* | (2006.01) |
| *H04L 12/24* | (2006.01) |
| *G06F 17/30* | (2006.01) |
| *H04L 29/06* | (2006.01) |
| *G06F 21/53* | (2013.01) |
| *G06F 9/455* | (2006.01) |
| *H04L 12/46* | (2006.01) |

(52) U.S. Cl.
CPC .......... *H04L 41/00* (2013.01); *G06F 9/45558* (2013.01); *G06F 17/30* (2013.01); *G06F 17/30569* (2013.01); *G06F 17/30575* (2013.01); *G06F 21/53* (2013.01); *H04L 63/0272* (2013.01); *H04L 12/4641* (2013.01)

(58) Field of Classification Search
CPC ............ H04L 12/4641; H04L 63/0272; H04L 63/145; H04L 43/028; H04L 43/04; H04L 43/12; H04L 63/1416; G06F 21/53; G06F 9/45558; G06F 21/566; G06F 2009/45595; G06F 17/30575; G06F 17/30; G06F 17/30569
See application file for complete search history.

(56) References Cited

U.S. PATENT DOCUMENTS

| | | | | |
|---|---|---|---|---|
| 7,152,090 | B2 * | 12/2006 | Amirisetty | G06F 9/465 707/999.101 |
| 8,990,944 | B1 * | 3/2015 | Singh | G06F 21/56 726/24 |
| 2009/0125989 | A1 * | 5/2009 | Flaherty | G06F 21/54 726/5 |
| 2012/0185913 | A1 * | 7/2012 | Martinez | G06F 9/455 726/1 |
| 2015/0089031 | A1 * | 3/2015 | Kalali | H04L 67/34 709/220 |

* cited by examiner

*Primary Examiner* — Chirag R Patel (74) *Attorney, Agent, or Firm* — Lowenstein Sandler LLP (57) ABSTRACT

An apparatus identifies a connector configuration event. Responsive to the connector configuration event, the apparatus sends an external service information request. The apparatus receives an external service reply to the external service information request. The apparatus performs connector configuration, wherein the connector configuration employs information included in the external service reply, and wherein the performing connector configuration yields a connector employable in consumer external service access.

25 Claims, 5 Drawing Sheets

CONNECTOR CONFIGURATION FOR EXTERNAL SERVICE PROVIDER

CROSS-REFERENCE TO RELATED APPLICATION

This application claims the benefit of U.S. Provisional Application No. 61/923,196 filed Jan. 2, 2014, which is incorporated herein by reference in its entirety.

TECHNICAL FIELD

This disclosure relates to the field of virtualization and, in particular, to the provision of access to external services.

BACKGROUND

External services may be employed with respect to a virtualization environment to allow for the use of functionality not natively offered by the virtualization environment, and/or to offload services which might otherwise be handled in a fashion internal to the virtualization environment.

However, such use of external services typically necessitates the modification of virtualization environment elements such as virtual machines, hypervisors, and virtualization managers.

BRIEF DESCRIPTION OF THE DRAWINGS

The present disclosure is illustrated by way of example, and not by way of limitation, in the figures of the accompanying drawings.

DETAILED DESCRIPTION

External service providers offer external services including networking as a service, storage as a service, virtual machine (VM) hosting as a service, VMs as a service, load balancing as a service, virtual private network (VPN) as a service, and computation as a service (e.g., allowing for the offloading of processor-intensive VM or other processes). Offered external services include virtual and/or non-virtual (e.g., physically-based) services. Consumers, such as, virtualization managers, hypervisors, and VMs can make use of these external services. By so doing, benefits can be accrued. For example, where such consumers are associated with a virtualization environment the use of such external services can allow the consumers to make use of functionality not natively offered by the virtualization environment. As another example, the use of external services can ease virtualization environment management and implementation by tasking an external service provider with the responsibility of handling, say, one or more networks of the virtualization environment.

However, the use of external services typically necessitates that specificities of the external services—such as approaches to be followed (e.g., Application Program Interfaces (APIs) to be employed, interprocess communications to be employed, data elements to be provided, data formats to be employed, and/or protocols to be employed) when interacting with the external services—be made a point of concern. As such, where a consumer is to make use of an external provider, the consumer's operation is typically changed. This may necessitate modification of the consumer. Switching of external providers may be viewed as a burdensome and unattractive affair due to, say, a concomitant consumer modification. As such, there may be a hesitance to commence making use of external providers, and/or an inertia against switching from an initially-selected external provider to a different external provider. In a similar vein there may be a hesitance to audition external providers.

Set forth herein are examples of approaches by which a consumer may make use of an external service while being shielded from the specificities of the external service. According to an example, a consumer may have at its disposal a configurable connector. The configurable connector may be a virtual interface (e.g., a virtual network interface card (vNIC)) or one or more code modules (e.g., instantiated objects). A proxy may communicate with the external service and receive information therefrom. The proxy then may use the received information in configuring the connector. The consumer then may employ the connector in making use of the external service. The consumer may so employ the connector without the involvement of the proxy. With the consumer thusly making use of an external service while being shielded from the specificities of the external service, enjoyed, for instance, may be the avoidance of consumer modification and the easing of the employ of external service providers.

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely examples. Particular implementations may vary from these example-only details and still be contemplated to be within the scope of the present invention.

Figure 1:
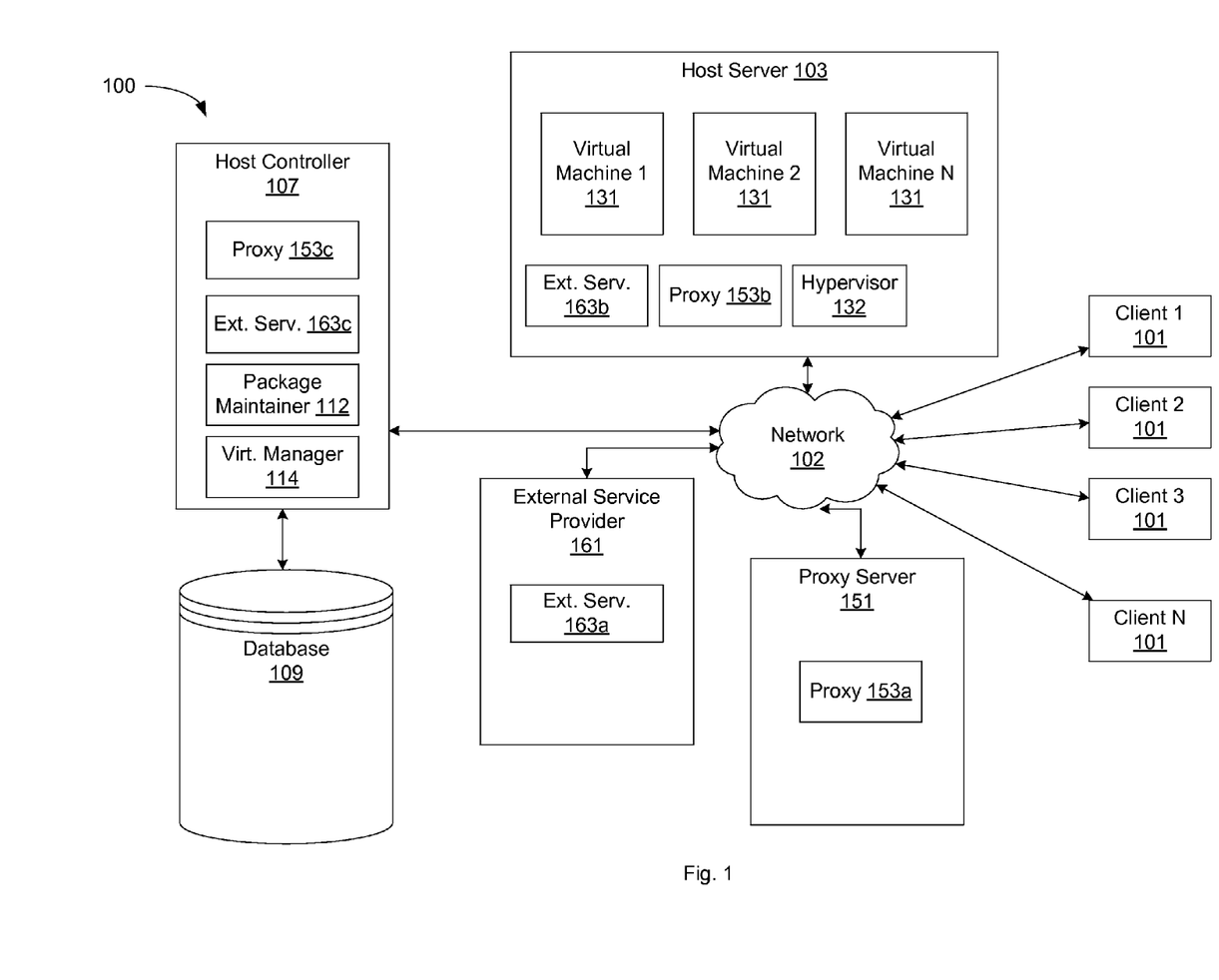
FIG. 1 illustrates an example network architecture in which examples of the present invention may operate.

FIG. 1 illustrates an example network architecture 100 in which examples of the present invention may operate. The network architecture 100 includes one or more host servers 103 coupled to clients 101 over a network 102. The network 102 may be a private network (e.g., a local area network (LAN), wide area network (WAN), intranet, etc.) or a public network (e.g., the Internet). The host servers 103 may also be coupled to a host controller 107 (via the same or a different network or directly). Host controller 107 may be an independent machine such as a server computer, a desktop computer, etc. Alternatively, the host controller 107 may be part of the host servers 103. In one example, the network architecture 100, including host controller 107, host servers 103 and clients 101, may be referred to as a virtualization environment.

The network architecture also includes one or more proxy servers 151 coupled over network 102. Proxy server 151 may be an independent machine such as a server computer, a desktop computer, etc. Alternatively, the proxy server 151 may be part of the host servers 103 and/or part of the host controllers 107. The network architecture additionally includes one or more external service providers 161 coupled over network 102. External service provider 161 may be an independent machine such as a server computer, a desktop computer, etc. Alternatively, the external service provider 161 may be part of the host servers 103 and/or part of the host controllers 107.

Proxy server 151 may include proxy 153a, host server 103 may include proxy 153b, and/or host controller 107 may include proxy 153c. In accordance with that which is discussed in greater detail hereinbelow, such a proxy may communicate with external service 163a, external service 163b, and/or external service 163c, and receive information therefrom. In further accordance with that which is discussed in greater detail hereinbelow, such a proxy then may use the received information in configuring a connector. External service provider 161 may include external service 163a, host server 103 may include external service 163b, and host controller 107 may include external service 163c. In accordance with that which is discussed in greater detail hereinbelow, external services include networking as a service, storage as a service, virtual machine VM hosting as a service, VMs as a service, load balancing as a service, virtual VPN as a service, and computation as a service.

In one example, the clients 101 may include computing devices that have a wide range of processing capabilities. Some or all of the clients 101 may be thin clients, which serve as access terminals for users and depend primarily on the host servers 103 for processing activities. For example, the client 101 may be a desktop computer, laptop computer, cellular phone, personal digital assistant (PDA), etc. The client 101 may run client applications such as a Web browser. The client 101 may also run other client applications, which receive multimedia data streams or other data from the host server 103 and re-direct the received data to a local display or other user interface.

Host servers 103 may include server computers or any other computing devices capable of running one or more virtual machines 131. Each virtual machine 131 runs a guest operating system (OS) that may be different from one virtual machine to another. The guest OS may include Microsoft Windows, Linux, Solaris, Mac OS, etc. The host server 103 may include a hypervisor 132 that emulates the underlying hardware platform for the virtual machines 131. The hypervisor 132 may also be known as a virtual machine monitor (VMM) or a kernel-based hypervisor.

Each virtual machine 131 can be accessed by one or more of the clients 101 over the network 102 and can provide a virtual desktop for the client(s) 101. From the user's point of view, the virtual desktop functions as a physical desktop (e.g., a personal computer) and is indistinguishable from a physical desktop. Each virtual machine 131 may be linked to one or more virtual disks. These virtual disks can be logical partitions of a physical disk managed by hypervisor 132, can be cloud based storage devices, or can be some other type of virtual storage device. In one example, virtual disks may form a whole or part of a logical data center. In one example, virtual machines 131 and virtual disks, together with host servers 103, may be collectively referred to as entities in a virtual machine system.

The virtual machines 131 and virtual disks are managed by the host controller 107. Host controller 107 may manage the allocation of resources from host server 103 to virtual machines 131. In addition, host controller may monitor the status of virtual machines 131 as well as the progress of commands and processes being executed by virtual machines 131 and/or on virtual machines 131. The host controller 107 may include a virtualization manager 114 to perform management operations in the virtualization system, including for example allocating resources of host servers 103 to virtual machines 131, monitoring the status of virtual machines 131, monitoring the progress of commands and processes being executed by virtual machines 131, etc.

The host controller 107 may also maintain a management database 109 used by the virtualization manager 114 for the above management operations.

In one example, host controller 107 also includes a package maintainer 112 to install, upgrade, or configure software packages on the host controller 107 in a consistent manner. In one example, package maintainer 112 is the RPM package manager from Red Hat, Inc. For example, the package maintainer 112 may be used to install or upgrade the virtualization manager 114 on the host controller 107.

With further regard to FIG. 1, as an example a VM 131, hosted by hypervisor 132, may be a consumer, and the external service may be networking as a service. As another example hypervisor 132 may be a consumer and the external service may be storage as a service which may be employed by the hypervisor for accessing disk images of virtual machines hosted by the hypervisor. As a further example, virtualization manager 114 may be a consumer and the external service may be VM hosting as a service which may be employed by the virtualization manager as a source of virtual machine hosts to be subject to its management (e.g., hosts to which virtual machines can be deployed).

Figure 2:
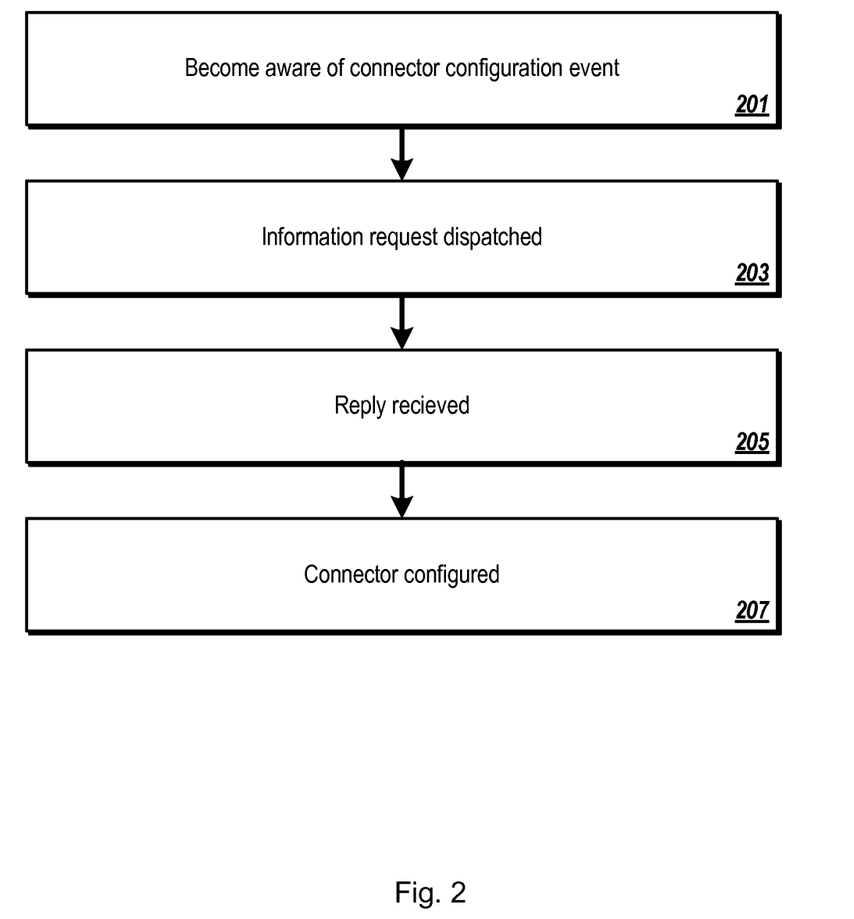
FIG. 2 is a flow diagram illustrating a method of configuring a connector, according to an example.

FIG. 2 illustrates a flow diagram of one example of a method of configuring a connector. The method may be performed by processing logic that comprises hardware (e.g., circuitry, dedicated logic, programmable logic, microcode, etc.), software (such as instructions run on a processing device), or a combination thereof. As one example, the method may be performed by a proxy running on a computing device. For instance, the method may be performed by proxy 153a running on proxy server 151, proxy 153b running on host server 103, and/or proxy 153c running on host controller 107.

Referring to FIG. 2, at block 201 processing logic becomes aware of an event in response to which the connector will be configured. As one example the event is an attempt of a consumer to access an external service. As another example the event a launch of a consumer. Performance of block 201 might, for instance, be performed such that each attempt of the consumer to access the external service is considered an event, such that only a first attempt of the consumer to access the external service is considered an event, and/or that only one attempt, within a given time period, of the consumer to access the external service is considered an event (e.g., only one access attempt per quarter-hour might be considered an event).

At block 203, processing logic dispatches an information request to an external service. The external service to which the request is dispatched may, for instance, be the external service to which a consumer access attempt was made or an external service to which the to-be-configured connector corresponds. As one example the processing logic includes in the request an indication of particular desired information which will allow for the connector to be configured. As another example the processing logic does not so include such indication, with it being the case that the external service will reply to the request with information which will allow for the connector to be configured. At block 205, the processing logic receives from the external service an information-bearing reply. Although so as to facilitate description a single information request dispatch is discussed in connection with block 203 and a single information-bearing reply is discussed in connection with block 205, other possibilities exist. For instance, there may be a multitude of such requests and replies (e.g., before occurrence of that which is discussed hereinbelow in connection with block 207).

At block 207, the processing logic employs, in configuring the connector, the information which was borne by the reply. Examples of the information include information regarding protocols and/or data formats (e.g., packet structure, message structure, and/or data flow control commands), authentication, encryption, network address, network port, virtual local area network (VLAN) identifier, and/or media access control (MAC) address.

With further regard to block 207, as an example, where the connector is a virtual interface such configuration may involve the processing logic modifying a descriptor corresponding to the virtual interface (e.g., an eXtensible Markup Language-based (XML-based) descriptor). As another example, where the connector is one or more code modules such configuration may involve the processing logic sending one or more interprocess and/or API communications to the connector. The interprocess and/or API communications might may involve the use of XML-Remote Procedure Call (XML-RPC), Representational State Transfer (REST), Qpid, and/or Simple Object Access Protocol (SOAP). Having configured the connector, the processing logic (e.g., a proxy corresponding thereto) might not further interact with the connector or the external service unless again becoming aware of an event of the sort discussed above, and/or the consumer may so employ the connector without the involvement of the proxy.

Returning to block 201, with regard to the event being an attempt of the consumer to access the external service, as an example the configurable connector may be a virtual interface and in communication with the virtual interface may be a virtual tap (e.g., a virtual network tap). The processing logic may employ the virtual tap to monitor communications of the virtual interface and, thereby, become aware of the access attempt.

With further regard to the event being a consumer attempt to access the external service, as another example the configurable connector may be one or more code modules and in communication (e.g., interprocess and/or API communication) with the one or more configurable connector code modules may be one or more monitor code modules which monitor communications (e.g., interprocess and/or API communications) of the connector code modules (e.g., by virtue of being among code modules registered to receive communications of the connector code modules). The processing logic may (e.g., via interprocess and/or API communications) employ the monitor code modules to monitor communications of the configurable connector code modules and, thereby, become aware of the access attempt.

With regard to the event being a launch of the consumer, as an example the configurable connector may again be a virtual interface having a virtual tap in communication therewith. The processing logic may, when the consumer is launched, sense the virtual tap as having a condition to be addressed—a disconnected output port. By virtue of sensing this to-be-addressed condition, the processing logic may become aware of the launch.

With further regard to the event being a launch of the consumer, as another example the configurable connector may again be one or more code modules, and in communication (e.g., interprocess and/or API communication) with the one or more configurable connector code modules may again be one or more monitor code modules. The processing logic may, by virtue of being in communication with the monitor code modules (e.g., via interprocess and/or API communication), sense, when the consumer is launched, the monitor code modules as having a condition to be addressed—an undefined output target destination. By virtue of sensing this to-be-addressed condition, the processing logic may become aware of the launch.

Returning to block 203, according to an example there may be call that the processing logic, in order to receive the information, provide information to the external service. Examples of such information include a network port identifier associated with the consumer (e.g., with the network port identifier mapping to a network port to be employed by the consumer when using the external service), and/or credentials. According to another example, the processing logic might receive the information without such provision.

With further regard to block 203, according to an example, the external service, having received the request, makes preparations to accommodate upcoming use by the consumer of the external service (e.g., the external service reserves one or more network ports and/or other resources). According to another example, such preparation might not occur.

According to an example, the processing logic may establish a connection to the external service. For instance, in the case of a virtual interface and a virtual tap, the processing logic may connect the output of the virtual tap to the external service such that the virtual tap—being connected to the virtual interface at its input and to the external service at its output—serves in interconnecting the consumer and the external service. So connecting the output of the virtual tap may involve modifying a descriptor (e.g., an XML-based descriptor) corresponding to the virtual tap. For instance in the case of configurable code modules and monitor code modules, the processing logic may set the output target destination of the monitor code modules to the external service such that the monitor code modules—receiving input from the configurable code modules and having its output target destination set as the external service—serves in interconnecting (e.g., via interprocess and/or API communications) the consumer to the external service. So connecting the output target destination of the configurable connector code modules may include sending one or more interprocess and/or API communications to the monitor code modules.

Figure 3:
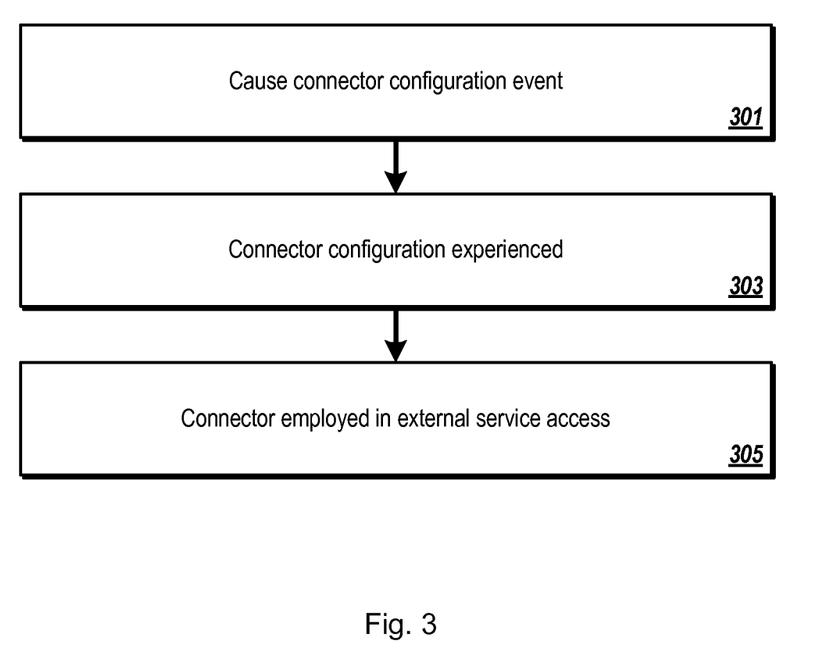
FIG. 3 is a flow diagram illustrating a method of consumer employ of a configurable connector, according to an example.

FIG. 3 illustrates a flow diagram of one example of a method of consumer employ of a configurable connector. The method may be performed by processing logic that comprises hardware (e.g., circuitry, dedicated logic, programmable logic, microcode, etc.), software (such as instructions run on a processing device), or a combination thereof. As one example, the method may be performed by a hypervisor running on a computing device (e.g., hypervisor 132 running on host server 103), by a VM running on a hypervisor (e.g., a VM 131 running on hypervisor 132, with hypervisor 132 in turn running on host server 103), and/or by a virtualization manager running on a computing device (e.g., virtualization manger 114 running on host controller 107).

Referring to FIG. 3, at block 301 processing logic causes an event in response to which the connector will be configured. As one example the event is an attempt of the consumer to access an external service. As another example the event a launch of the consumer. The functionality of block 301 may, in one aspect, be counterpart to the functionality discussed hereinabove with respect to block 201.

At block 303, processing logic experiences configuration of the connector (e.g., by a proxy). Such configuration may involve experiencing the modification of a descriptor (e.g., an XML-based descriptor) corresponding to the connector, and/or the receipt of one or more interprocess and/or API communications (e.g., from a proxy). The functionality of block 303 may, in one aspect, be counterpart to the functionality discussed hereinabove with respect to block 207.

At block 305, the consumer employs the connector in making use of the external service. For instance, where the connector is a virtual interface (e.g., a vNIC) the consumer employs the virtual connector in sending communication to and/or receiving communications from the external service (e.g., a network). Where for instance the connector is one or more code modules the consumer employs those code modules as a conduit for sending communications to and/or receiving communications from the external service (e.g., a network).

Figure 4:
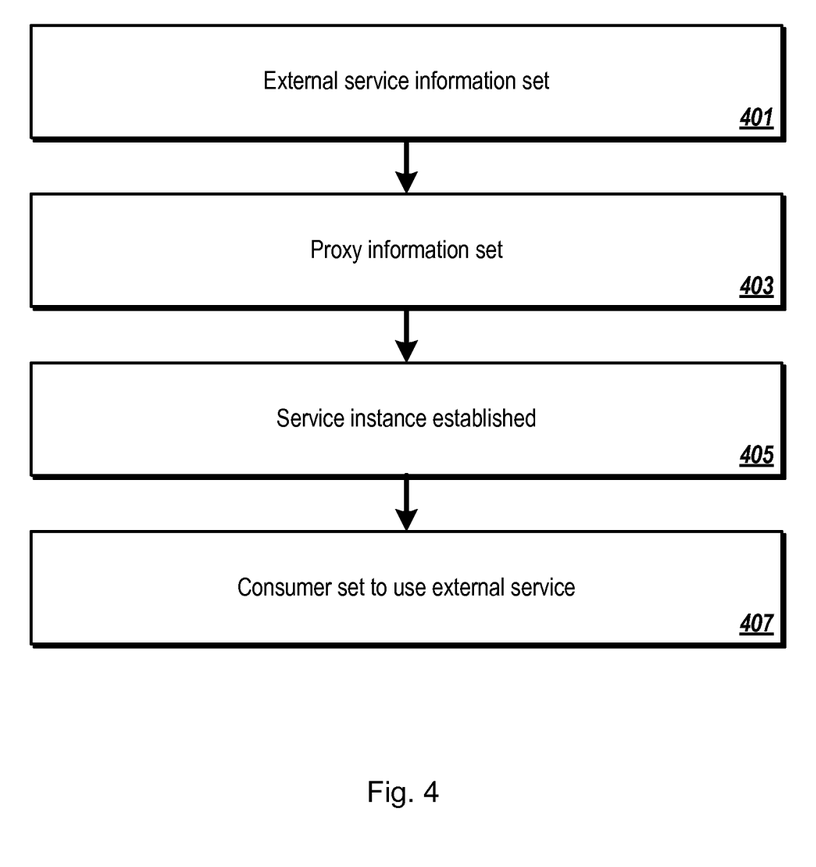
FIG. 4 is a flow diagram illustrating a method of configuring external service use, according to an example.

FIG. 4 illustrates a flow diagram of one example of a method of configuring external service use. The method may be performed by processing logic that comprises hardware (e.g., circuitry, dedicated logic, programmable logic, microcode, etc.), software (such as instructions run on a processing device), or a combination thereof. As one example, the method may be performed by a virtualization manager running on a computing device (e.g., virtualization manger 114 running on host controller 107).

Referring to FIG. 4, at block 401 external service information may be set. The set information may include external service name (e.g., a user-selectable name), external service type (e.g., networking as a service, storage as a service, or VM hosting as a service), external service plugin (e.g., where the external service supports plugins in the vein of the offered service), external service location (e.g., uniform resource locator (URL)), and/or authentication information (e.g., username and/or password). At block 403 proxy information may be set. The set information may include information employable in communicating with the proxy (e.g., via interprocess and/or API communication) such as host name, host port, and/or authentication information (e.g., username and/or password).

At block 405, a service instance may be established using the external service. The service instance establishment might associate the instance with a virtualization environment data center. The service instance establishment might not associate the instance with a virtualization environment data center. As one example a new service instance may be established. As another example an existing service instance which had previously been provided as other than an external service (e.g., a service instance which had been previously provided using local resources), or which had been previously provided as a different external service (e.g., via a different external service provider) may be transitioned to the at-hand external service. Such transitioning may include the provision (e.g., via interprocess and/or API communication) to the external provider of data describing the service instance (e.g., network parameters) and/or the provision (e.g., via interprocess and/or API communication) to the external provider of some or all of a descriptor (e.g., an XML-based descriptor) corresponding to the service instance. Discovery functionality may be provided in which information regarding available external services (e.g., networks), for which service instances may be established, may be obtained (e.g., via interprocess and/or API communication between the virtualization manager and the external service) and/or presented to a user (e.g., via a GUI).

With further regard to block 405, as an example of new service establishment where the at-hand service is networking as a service, information such as network name (e.g., a user-selectable name), network identifier (e.g., VLAN identifier), whether or not tagging (e.g., VLAN tagging) should be employed, network privileges (e.g., an indication of devices and/or users allowed network access), network type (e.g., VM network, storage network, and/or management network) and/or network label (e.g., a color code) may be set.

With still further regard to block 405, as an example of transitioning where the at-hand service is networking as a service, one or more established networks (e.g., VM logical networks, storage, networks, and/or management networks) may be selected to be transitioned to the at-hand service.

With additional regard to block 405, as an example in the case of new service establishment where the at-hand service is storage as a service, the establishment may involve the selection of a certain quantity of storage entities and/or storage entity sizes. Such storage entities may include disks, storage servers, and/or Redundant Arrays of Independent Disks (RAIDs), and may include virtual and/or non-virtual (e.g., physical) storage entities. As an example in the case of transitioning where the at-hand service is storage as a service, a storage entity configuration which had been previously in place (e.g., a selection of a certain quantity of storage entities and/or storage entity sizes) may be transitioned to the at-hand service.

At block 407, a consumer may be set to use the external service. In one aspect, a particular consumer (e.g., a particular VM, hypervisor, or virtualization manager) may be chosen to be a consumer for the at-hand external service. In another aspect, there may be, for the chosen consumer, indication of a configurable connector (e.g., a vNIC) of the consumer to be employed in accessing the service.

With further regard to FIG. 4 it is noted that, as an example, one or more of the discussed operations wherein information is specified or the like may, in whole or in part, involve user input (e.g., via a Graphical User Interface (GUI)). As another example such information specification may, in whole or in part, not involve user input (e.g., one or more automated processes may specify the information).

Also with regard to FIG. 4, as an example automatic setup functionality may be provided. Such automatic setup functionality may, for an external service, suggest one or more corresponding service instances and/or establishments of consumers to use the external service (e.g., there may be a suggestion of incorporating an externally-provided VM network into a virtualization environment data center and connecting it to one or more VMs). The suggestions may be based on a data store of common configurations (e.g., common network configurations) and/or a configuration history store (e.g., a history of previous configurations—such as network configurations—used for in the at-hand data center). The suggestions might then be accepted or rejected in whole or in part (e.g., by a user via a GUI)

According to an example, one or more network ports and/or other resources may be created and/or removed on an external service. Further according to the example, circumstances under which one or more network ports and/or other resources may be created include a consumer (e.g., a VM) which is set to use the external resource being launched, and a configurable connector (e.g., a virtual interface) which is set to provide connection to the external resource being added (e.g., hot plugged with respect to the external resource.

Still further according to the example, circumstances under which one or more network ports and/or other resources may be removed include the removal of a configurable connector (e.g., a virtual interface) which had been set to provide connection to the external resource, a configurable connector (e.g., a virtual interface), which had been set to provide connection to the external resource, being reconfigured (e.g., due to the modification of its descriptor) so as to no longer provide connection to the external resource, the occurrence of a snapshot and/or preview operation which serves to establish a time point which may invalidate the relationship between the consumer and the external resource (e.g., the establishment of a time point at which the configurable connector, which had been set to provide connection to the external resource, no longer exists), a consumer (e.g., a VM) which had set to use the external resource ceasing to exist, and a virtualization environment data center, with which a consumer set to use the external resource had been associated, ceasing to exist (e.g., having being removed forcefully).

According to an example, a discussed-herein external service may be one which may support plugins in the vein of the offered service (e.g., network plugins—such as plugins offering virtual switch functionality, virtual bridge functionality, or virtual router functionality—in the case of the external service being networking as a service).

According to an example, the consumer, in accessing a network as a service external service, may connect to a virtual networking entity such as a virtual switch, a virtual bridge, or a virtual router. Such a virtual networking entity may be part of a larger virtual network configuration (e.g., one or more virtual bridges, virtual switches, and/or virtual routers). Accordingly, the consumer's connection to the virtual networking entity may serve as the consumer's entryway to that larger virtual network configuration.

According to an example, the proxy may be implemented as a hypervisor extension. According to another example, the proxy may be implemented in a fashion other than as a hypervisor extension (e.g., as one or more code modules running in a separate address space from a hypervisor but perhaps in interprocess and/or API communication with the hypervisor).

According to an example, scheduling (e.g., scheduling performed by a virtualization manger) may take into account the availability—for instance temporarily unavailable/permanently unavailable/available status, performance level, and/or reliability level—of external services. For instance, scheduling with regard to a hypervisor cluster may take into account the availability of a network, provided as an external service, which provides access to that cluster (e.g., an external service-provided VM logical network). Ascertaining such external service availability may, according to an example, be possible (e.g., by the action of a virtualization manger). According to another example, scheduling may not so take into account the availability of external services. For instance, scheduling might assume that external services (e.g., external service-provided networks) do not fall into a state of unavailability.

According to an example, editing of properties of external services may be possible (e.g., via a GUI and/or via the action of a virtualization manger). For instance, with respect to an external service-provided logical network, properties such as employed network elements (e.g., virtual switches, virtual bridges, and/or virtual routers), network data rates, network protocols, network authentication, network subnets, and/or node connections may be editable. Subnet properties may include subnet names, subnet Classless Internet Domain Routing (CIDR) information (e.g., an IP address specifying the network name and the net mask prefix), and IP version (e.g., IPv4 or IPv6). The subnet properties may be employed (e.g., by a virtualization manager) in allocating IP addresses (e.g., to VMs). As examples, where there is a single subnet, IP address allocation candidates (e.g., VMs) may receive IP addresses from that subnet, where there is more than one subnet, IP address allocation candidates (e.g., VMs) may receive IP addresses from one of those subnets (e.g., in accordance with the directive of a user and/or the virtualization manager), and where no subnets exist, IP address allocation candidates (e.g., VMs) may not receive IP addresses. The IP address allocation candidates may receive the IP addresses via Dynamic Host Configuration Protocol (DHCP) (e.g., via a corresponding OS such as a guest OS where the allocation candidate is a VM). According to an example subnets may not be employed (e.g., in IP address allocation).

Also, according to an example the deletion of external service instances—for instance the deletion of an external service-provided logical network—may be possible (e.g., via a GUI and/or via the action of a virtualization manger). Moreover, according to an example functionality discussed herein may integrate with security groups. For instance, there may be integration with security group profiles, integration with the association of security groups with network ports, and/or integration with the association of security groups with configurable connectors (e.g., vNICS). Moreover, there may be integration with Internet Protocol Address Management (IPAM).

Figure 5:
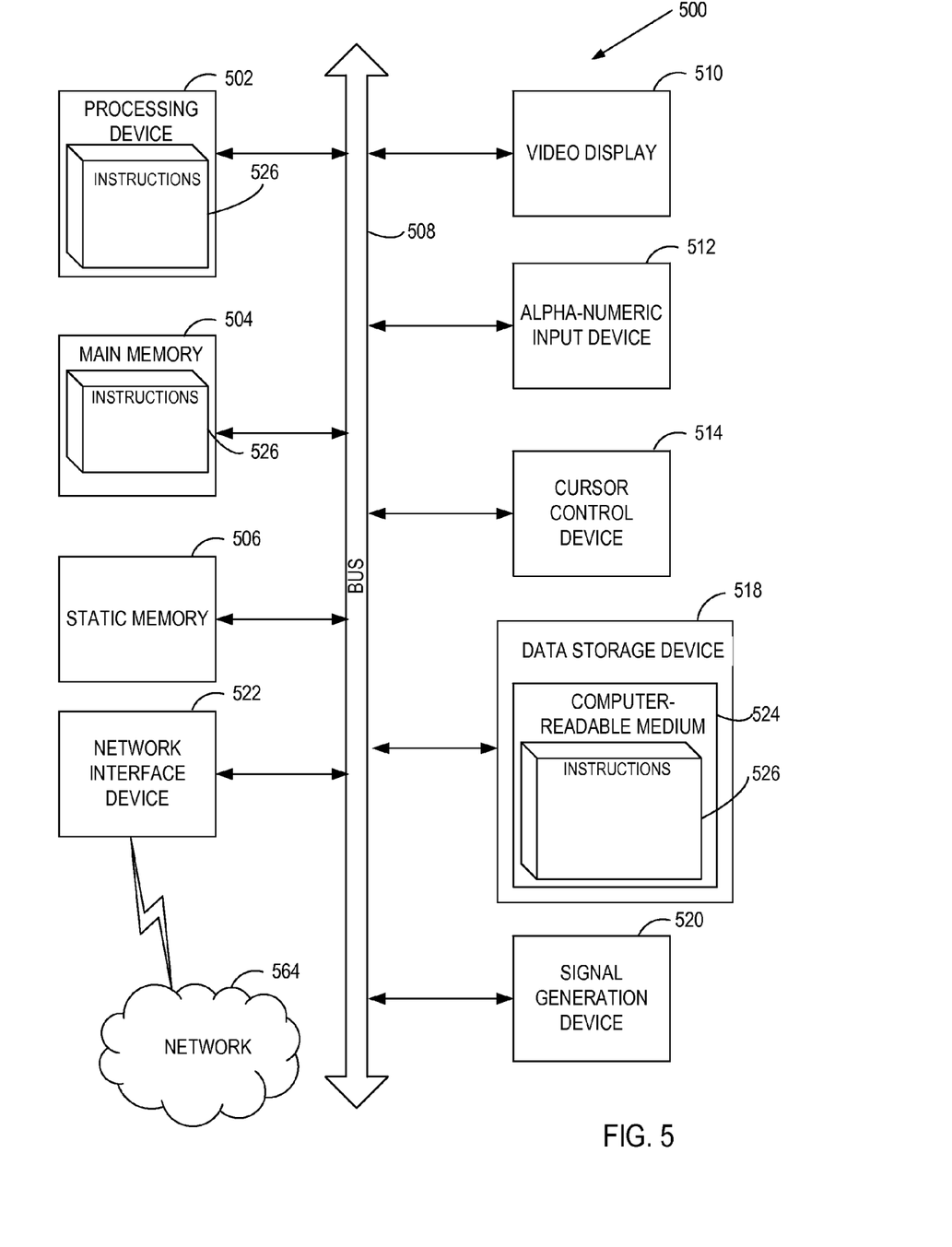
FIG. 5 is a diagrammatic representation of a machine, according to an example.

FIG. 5 illustrates a diagrammatic representation of a machine in the example form of a computing device 500 within which a set of instructions, for causing the machine to perform any one or more of the methodologies discussed herein, may be executed. In alternative examples, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The example computing device 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a secondary memory (e.g., a data storage device 518), which communicate with each other via a bus 508.

Processing device 502 represents one or more general-purpose processors such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. Processing device 502 is configured to execute the processing logic (instructions 526) for performing the operations and steps discussed herein.

The computing device 500 may further include a network interface device 522. The computing device 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The data storage device 518 may include a machine-readable storage medium (or more specifically a computer-readable storage medium) 524 on which is stored one or more sets of instructions 526 embodying any one or more of the methodologies or functions described herein. The instructions 526 may also reside, completely or at least partially, within the main memory 504, within the static memory 506 and/or within the processing device 502 during execution thereof by the computer system 500, the main memory 504, static memory 506 and the processing device 502 also constituting computer-readable storage media.

While the computer-readable storage medium 524 is shown in an example to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium other than a carrier wave that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner. It is to be understood that the above description is intended to be illustrative, and not restrictive. Many other embodiments will be apparent upon reading and understanding the above description. Although embodiments of the present invention have been described with reference to specific example embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled. Furthermore, the terms "first," "second," "third," "fourth," etc. as used herein are meant as labels to distinguish among different elements and may not necessarily have an ordinal meaning according to their numerical designation.

What is claimed is:

1. A method, comprising:
   identifying a connector configuration event;
   responsive to identifying the connector configuration event, sending an external service information request;
   receiving an external service reply to the external service information request; and
   performing, by a processing device, connector configuration using first information included in the external service reply to configure a connector employable in consumer external service access.

2. The method of claim 1, wherein the connector comprises at least one of a virtual interface, or a code module.

3. The method of claim 1, wherein the consumer external service access comprises one of virtual machine external service access, hypervisor external service access, or virtualization manager external service access.

4. The method of claim 1, wherein the first information included in the reply comprises at least one of protocol information, data format information, authentication information, encryption information, network address information, network port information, virtual local area network identifier information, or media access control address information.

5. The method of claim 1, wherein the configuration event is one of a consumer external service access attempt or a consumer launch.

6. The method of claim 1, wherein the identifying of the connector configuration event comprises at least one of employing a virtual tap to monitor communications of the connector or employing a monitor to monitor communications of the connector.

7. The method of claim 1, further comprising providing second information, wherein the provided second information comprises at least one of a consumer network port identifier or credentials.

8. The method of claim 1, further comprising establishing an external service connection corresponding to the consumer external service access, wherein the connection establishment comprises at least one of connecting a virtual tap output or setting a monitor output target destination.

9. A method, comprising:
   setting external service information;
   setting proxy information;
   establishing, by a processing device, an external service instance in view of the external service information and the proxy information; and
   setting an external service use in view of the external service instance, comprising identifying a configurable connector to be employed in accessing the external service instance.

10. The method of claim 9, wherein the external service information comprises at least one of external service name, external service type, external service plugin, external service location, or authentication information.

11. The method of claim 9, wherein the establishing of the external service comprising transitioning an existing service instance to the external service.

12. An apparatus, comprising:
    a memory; and
    a processing device operatively coupled to the memory, the processing device to:
       identify a connector configuration event;
       responsive to identifying the connector configuration event, send an external service information request;
       receive an external service reply to the external service information request; and perform connector configuration using first information included in the external service reply to configure a connector employable in consumer external service access.

13. The apparatus of claim 12, wherein the connector comprises at least one of a virtual interface, or a code module.

14. The apparatus of claim 12, wherein the consumer external service access comprises one of virtual machine external service access, hypervisor external service access, or virtualization manager external service access.

15. The apparatus of claim 12, wherein the first information included in the reply comprises at least one of protocol information, data format information, authentication information, encryption information, network address information, network port information, virtual local area network identifier information, or media access control address information.

16. The apparatus of claim 12, wherein the configuration event is one of a consumer external service access attempt or a consumer launch.

17. The apparatus of claim 12, wherein the identifying of the connector configuration event comprises at least one of employing a virtual tap to monitor communications of the connector or employing a monitor to monitor communications of the connector.

18. The apparatus of claim 12, wherein the processing device further executes instructions to provide second information, wherein the provided second information comprises at least one of a consumer network port identifier or credentials.

19. The apparatus of claim 12, wherein the processing device further executes instructions to establish an external service connection corresponding to the consumer external service access, wherein the connection establishment comprises at least one of connecting a virtual tap output or setting a monitor output target destination.

20. A non-transitory machine-readable storage medium storing instructions which, when executed, cause a processing device to:
identify a connector configuration event;
responsive to identifying the connector configuration event, send an external service information request;
receive an external service reply to the external service information request; and
perform, by the processing device, connector configuration using first information included in the external service reply to configure a connector employable in consumer external service access.

21. The non-transitory machine-readable storage medium of claim 20, wherein the connector comprises at least one of a virtual interface, or a code module.

22. The non-transitory machine-readable storage medium of claim 20, wherein the consumer external service access comprises one of virtual machine external service access, hypervisor external service access, or virtualization manager external service access.

23. The non-transitory machine-readable storage medium of claim 20, wherein the first information included in the reply comprises at least one of protocol information, data format information, authentication information, encryption information, network address information, network port information, virtual local area network identifier information, or media access control address information.

24. The non-transitory machine-readable storage medium of claim 20, wherein the configuration event is one of a consumer external service access attempt or a consumer launch.

25. The non-transitory machine-readable storage medium of claim 20, wherein to identify the connector configuration event, the processing device to employ at least one of a virtual tap to monitor communications of the connector or a monitor to monitor communications of the connector.

* * * * *